(12) United States Patent
Van Gorkom et al.

(10) Patent No.: US 8,388,175 B2
(45) Date of Patent: Mar. 5, 2013

(54) LIGHTING DEVICE

(75) Inventors: Ramon Pascal Van Gorkom, Eindhoven (NL); Christoph Gerard August Hoelen, Eindhoven (NL); Marco Van As, Eindhoven (NL); Cornelis Adrianus Henricus Antonius Mutsaers, Eindhoven (NL); Huib Cooijmans, Son en Breugel (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 399 days.

(21) Appl. No.: 12/671,946

(22) PCT Filed: Aug. 4, 2008

(86) PCT No.: PCT/IB2008/053107
§ 371 (c)(1),
(2), (4) Date: Feb. 3, 2010

(87) PCT Pub. No.: WO2009/022255
PCT Pub. Date: Feb. 19, 2009

(65) Prior Publication Data
US 2011/0063834 A1 Mar. 17, 2011

(30) Foreign Application Priority Data
Aug. 10, 2007 (EP) ..................... 07114151

(51) Int. Cl.
*F21V 9/00* (2006.01)
(52) U.S. Cl. ..... 362/231; 362/235; 362/293; 362/296.1; 362/328; 362/311.12
(58) Field of Classification Search .................. None
See application file for complete search history.

(56) References Cited

U.S. PATENT DOCUMENTS

| 5,255,171 | A  | 10/1993 | Clark |
| 6,139,166 | A  | 10/2000 | Marshall et al. |
| 6,177,761 | B1 | 1/2001  | Pelka et al. |

(Continued)

FOREIGN PATENT DOCUMENTS

| WO | 0058664 A1    | 10/2000 |
| WO | 2006033032 A1 | 3/2006  |

(Continued)

*Primary Examiner* — Sharon Payne
(74) *Attorney, Agent, or Firm* — John Salazar; Mark Beloborodov

(57) ABSTRACT

A lighting device (100, 200, 300, 400) is disclosed. The device comprises a plurality of light sources (111, 119, 120, 211, 219, 220) providing light in different wavelengths, a collimating means (104, 204) having a receiving end (103, 203, 407) and an output end (114, 214, 409), wherein said light sources are arranged at said receiving end. The collimating means comprises a set of wavelength selective filters (109, 110, 115, 116, 117, 118, 215, 217) arranged as sub-collimators (106, 107, 108, 206, 207, 208) to each of said plurality of light sources such that, for each light source, said sub-collimator collimates the light from its light source, and said wavelength selective filter of said each light source is translucent for light from adjacent light sources of different wavelength, and a second set of wavelength selective filters comprising compensation filters (222, 224, 226, 228, 230, 232) wherein each compensation filter is arranged symmetrically with respect to corresponding part of the wavelength selective filter of said first set around a general light direction of the corresponding light source.

17 Claims, 4 Drawing Sheets

U.S. PATENT DOCUMENTS

| | | |
|---|---|---|
| 6,527,411 B1 | 3/2003 | Sayers |
| 2004/0120647 A1 | 6/2004 | Sakata et al. |
| 2004/0141308 A1 | 7/2004 | Saccomanno |
| 2005/0047135 A1* | 3/2005 | Rhoads et al. ............ 362/240 |
| 2006/0039160 A1 | 2/2006 | Cassarly et al. |
| 2006/0262283 A1 | 11/2006 | Kurosaki |
| 2006/0285324 A1 | 12/2006 | Ansems et al. |
| 2011/0228527 A1* | 9/2011 | Van Gorkom et al. ........ 362/231 |

FOREIGN PATENT DOCUMENTS

| | | |
|---|---|---|
| WO | 2006129220 A1 | 12/2006 |

* cited by examiner

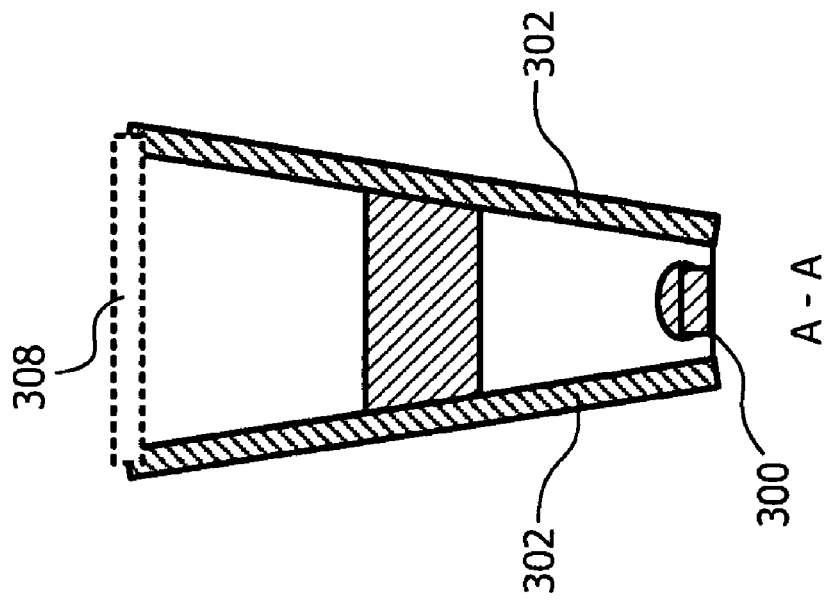
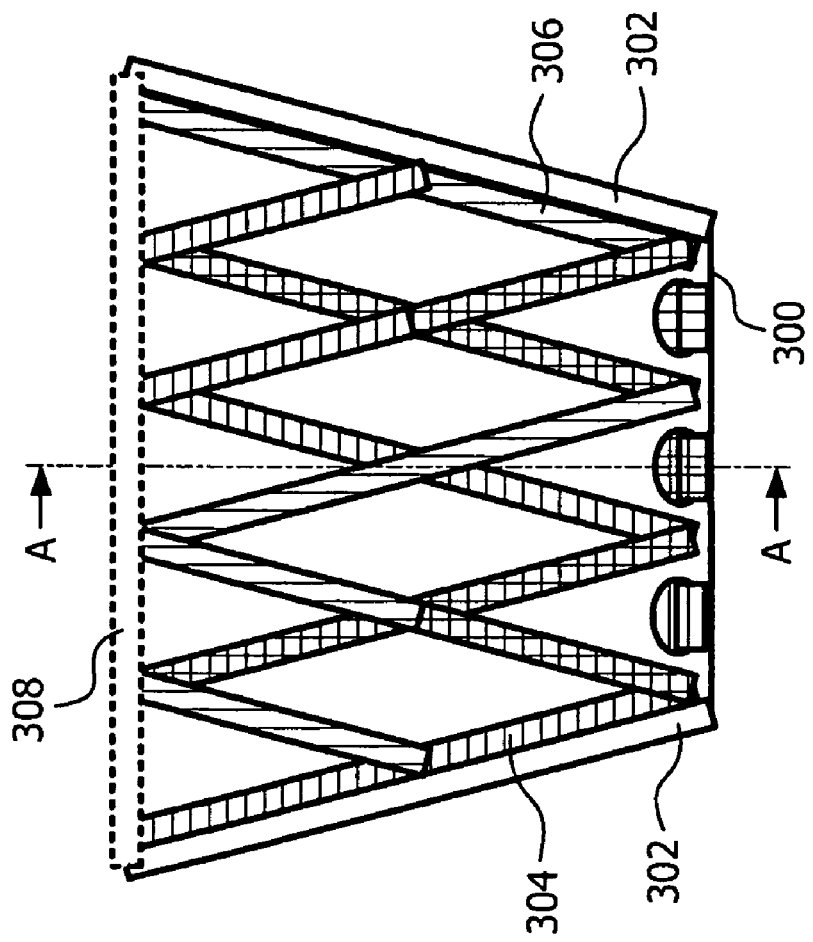
FIG. 3b
FIG. 3a

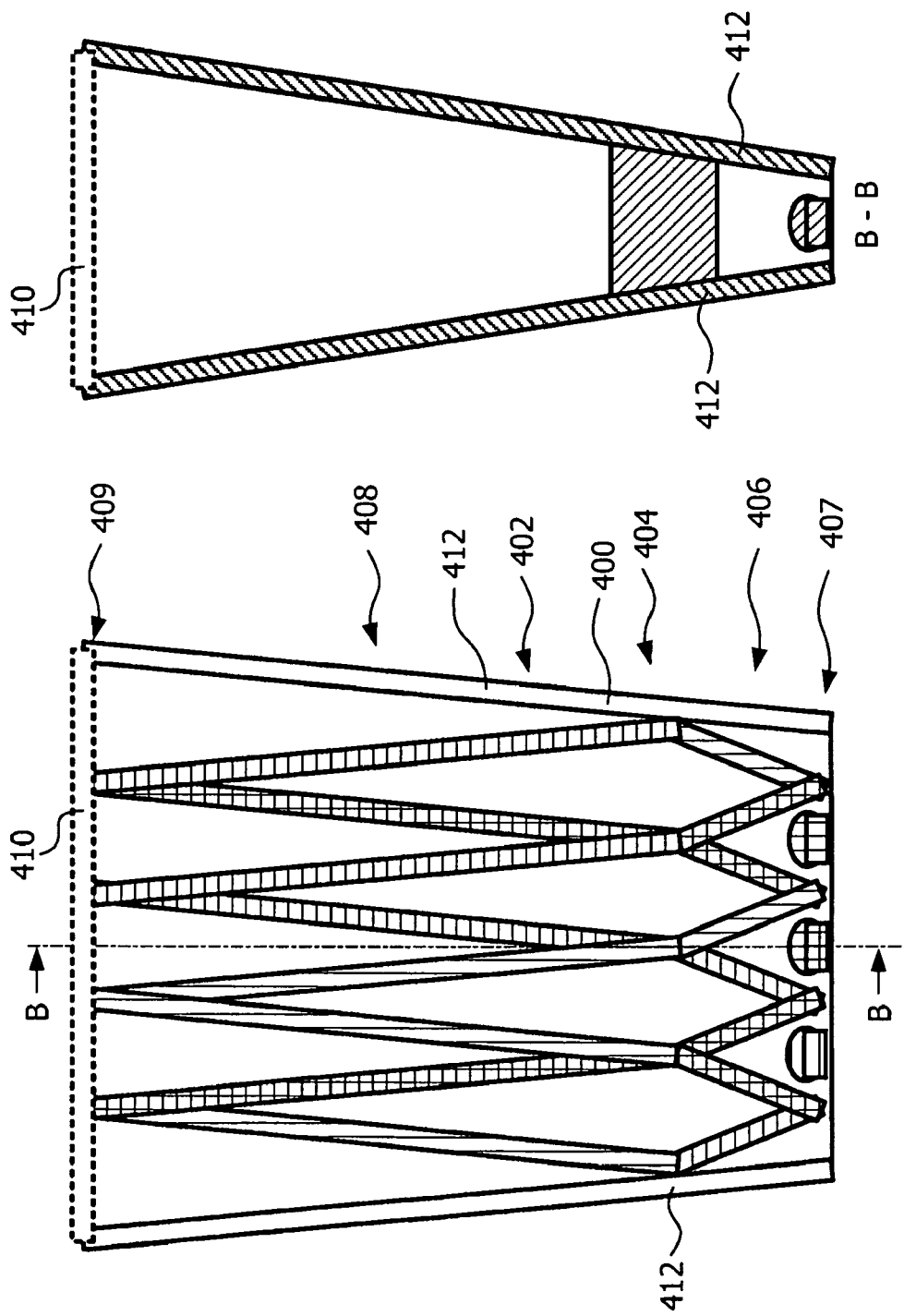

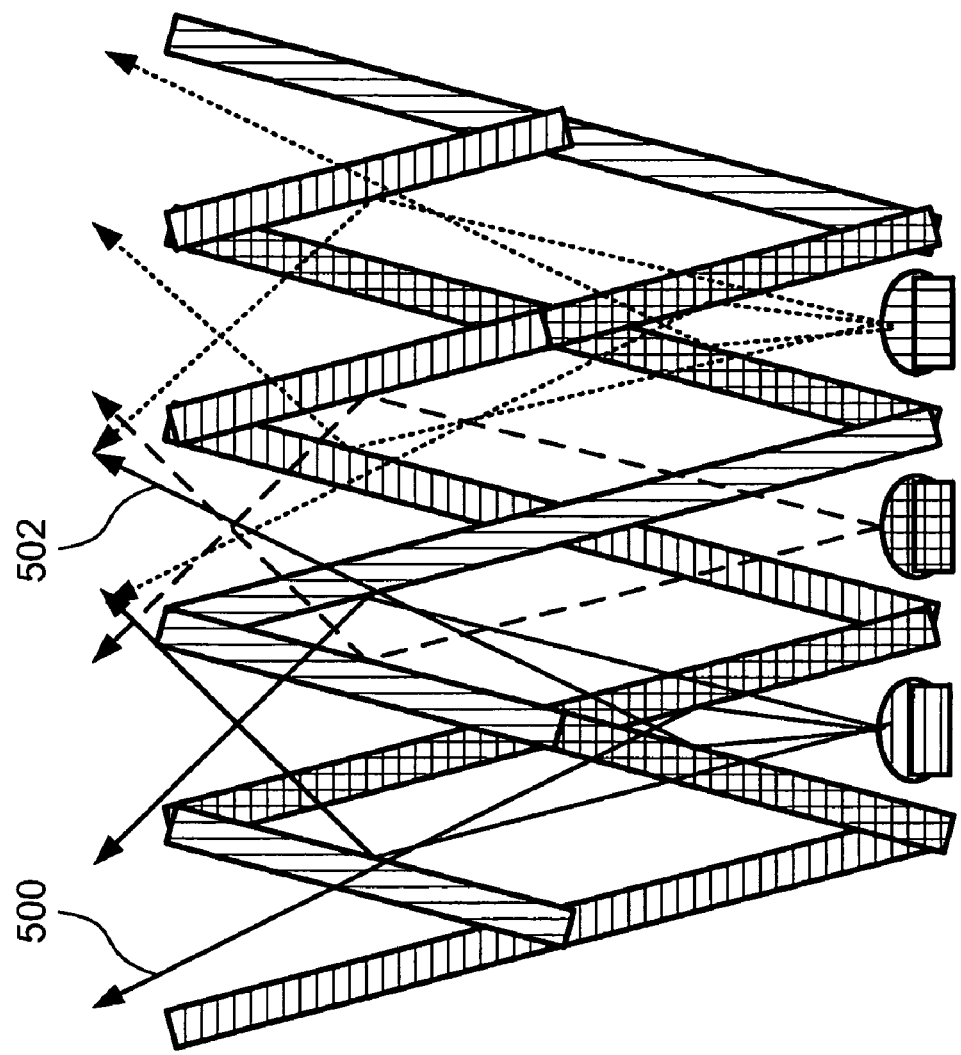

LIGHTING DEVICE

TECHNICAL FIELD

The present invention relates to a lighting device. In particular, the present invention relates to a lighting device having a set of wavelength selective filters arranged as sub-collimators to collimate light from a plurality of light sources.

BACKGROUND OF THE INVENTION

WO 2006/129220 A1 discloses a light emitting device comprising collimating means comprising filters reflecting light of certain properties towards an output area of the collimating means. There may be effects of discoloration with light emitting devices as the one disclosed in WO 2006/129220 A1, due to unwanted reflections in the filters. It is therefore a desire to provide an improved lighting device.

SUMMARY OF THE INVENTION

In view of the above, an objective of the invention is to solve or at least reduce the problems discussed above. In particular, an objective is to reduce discoloration.

The present invention is based on the understanding that unwanted reflections in the wavelength selective filters may occur at flat incident light towards the filters. The invention is further based on the understanding that provision of a more symmetrical structure of the filter configuration in the lighting device will make the unwanted light spread more uniform, and thus reduce discoloration.

According to a first aspect of the present invention, there is provided a lighting device comprising a plurality of light sources providing light in different wavelengths, a collimating means having a receiving end and an output end, wherein said light sources are arranged at said receiving end, and said collimating means comprising a set of wavelength selective filters arranged as sub-collimators to each of said plurality of light sources such that, for each light source, said sub-collimator collimates the light from its light source, and said wavelength selective filter of said each light source is translucent for light from adjacent light sources of different wavelength, and a second set of wavelength selective filters comprising at least one compensation filter wherein said compensation filter is arranged symmetrically with respect to corresponding part of the wavelength selective filter of said first set around a general light direction of the corresponding light source. Thus, reflections due to flat'incident angles towards the wavelength selective filters of the first set is compensated by corresponding compensation filters giving a reflection that is symmetrical around a general light direction of the corresponding light source, and thus a more uniform spread, resulting in less discoloration. Here, symmetry around a general light direction of the corresponding light source should be construed as symmetry around a line thought to form the center of the light emitted from the light source which is spread as a concentrical beam around that line.

At least one of the compensation filters may have similar filter properties as its corresponding part of wavelength selective filter of the first set. Thereby, symmetry also in respect of filter properties is achieved to provide the uniform spread.

At least one of the compensation filters may be an all pass filter such that any reflection is due to flat incident light angle. This can for example be a glass plate. Thus, filter properties do not have to be considered and/or the compensation filter is cheaper and easier to manufacture.

The compensation filters may each have properties of essentially passing wavelengths associated to the sub-collimator or sub-collimators in which they are present, respectively. Thereby, the compensation filters do not interfere with neighboring sub-collimation.

The assignment of filter properties of the compensation filters may be different for the compensation filters. Thus, one compensation filter may have similar filter properties as its corresponding part of wavelength selective filter of the first set, another compensation filter may be an all pass filter. Here, it should be noted that one or more compensation filters may be provided in the lighting device, depending on the requirements for compensation.

The compensation filters may each have properties of essentially passing wavelengths associated to the sub-collimator or sub-collimators in which they are present, respectively.

The filters may have an angle to a general light output direction of 3 to 30 degrees, preferably 5 to 15 degrees, preferably 9 to 11 degrees, preferably about 10 degrees.

Those of said filters or parts of filters arranged at a part closest to said receiving end may have an angle to a general light output direction of 15 to 30 degrees, preferably 20 to 25 degrees, preferably 21 to 22 degrees, and those of said filters or parts of filters arranged at a part closest to said output end may have an angle to a general light output direction of 3 to 15 degrees, preferably 4 to 10 degrees, preferably 5 to 6 degrees.

The wavelengths of light may be essentially in the range of wavelength for visible light. However, the present invention may also be applicable for other radiation, such as infrared, ultraviolet, or x-ray radiation.

The light sources may comprise solid state light sources. The solid state light sources may comprise light emitting diodes.

The light sources may comprise three light sources emitting essentially red, green, and blue light, respectively.

Any of the wavelength selective filters may be a dichroic filter.

The collimating means may further comprise a surrounding reflector. Here, it should be noted that the surrounding reflector may be a part of one or more of the sub-collimators when this or these one or more sub-collimators are arranged at a boundary of the collimating means.

The lighting device may further comprise a diffusor at said output end. The diffusor may be a holographic diffusor. This will further minimize intensity and/or color non-uniformities.

The wavelength selective filters may be high pass or low pass filters. The benefit of using high pass or low pass filters instead of band pass or band stop filters is that it is easier to achieve good filter properties in high pass and low pass filters than in band pass and band stop filters.

A wavelength selective filter of any of said sub-collimators for a light source adjacing another light source having longer wavelength may be a low pass filter, and a wavelength selective filter of any of said sub-collimators for a light source adjacing another light source having shorter wavelength may be a high pass filter. By this arrangement, the light sources and their sub-collimators can be stacked together without interfering, thus providing a smaller unit, and better color mixing.

The light sources may be arranged in wavelength order. This will enable avoiding use of band pass or band stop filters.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present invention will appear from the following detailed disclosure, from the attached dependent claims as well as from the drawings.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 3 illustrates a lighting device according to an embodiment of the present invention;

FIG. 4 illustrates a lighting device according to an embodiment of the present invention; and FIG. 5 illustrates possible reflections due to flat incident angle towards filters of a lighting device.

DETAILED DESCRIPTION OF PREFERRED EMBODIMENTS

Figure 1:
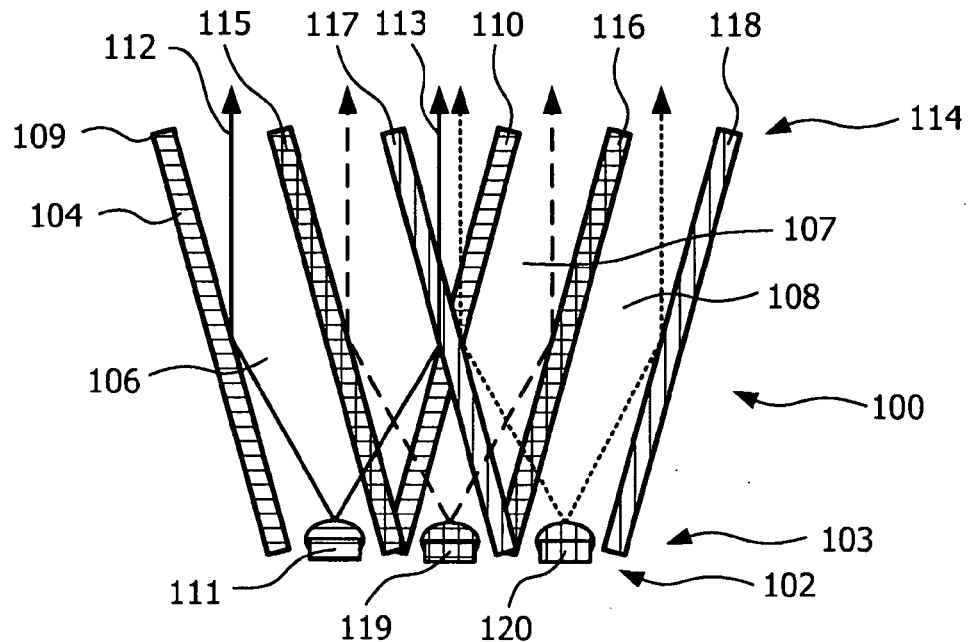
FIG. 1 schematically illustrates a lighting device.

FIG. 1 schematically illustrates a lighting device 100 comprising a plurality of light sources 102 each having different wavelength ranges such that the lighting device 100 is able to provide light with desired color properties, e.g. white light with a preferred color temperature or colored light. Choice and control of the light sources 102 to achieve the preferred color temperature is known withing the art, and is not a part of the present invention. However, for the purpose of better understanding, it should be noted that the light sources 102 can advantageously comprise light emitting diodes (LEDs), for example providing red, green and blue light, respectively. The light sources 102 are arranged at a receiving end 103 of a collimating means 104 of the lighting device 100.

Thus, the lighting device 100 comprises the collimating means 104 comprising a sub-collimator 106, 107, 108 for each of the light sources 102. For the understanding of the invention, sub-collimator 106 is looked at. Sub-collimator 106 comprises collimation elements 109, 110 which are reflective for the light that is emitted from the corresponding light source 111. The collimation elements 109, 110 can be wavelength selective filters, e.g. dichroic filters. Thus, these filters, i.e. collimation elements 109, 110, can be translucent for other colors of light, thus enabling the compact structure illustrated in FIG. 1. If for example light source 111 emits red light, the collimating elements are arranged to reflect red light, but is more or less translucent for green and blue light. Such a filter can be achieved by a glass plate with on each side a 16-layer $SiO_2$ and $Ta_2O_5$ filter. This will reflect light with a wavelength of about a little more than 600 nm, i.e. red light, but transmit visible light with a shorter wavelength than that, i.e. green and blue light. If two exemplary rays 112, 113 of light from the light source 111 is regarded, the left ray 112 in FIG. 1 will be reflected by the corresponding collimating element 109 and exit at an output end 114 of the collimating means 104, and the right ray 113 in FIG. 1 will be transmitted through a neighboring collimating element 115, reflected by the corresponding collimating element 110, transmitted through a next neighboring collimating element 117, and exit at the output end 114 of the collimating means 104. By the properties of the neighboring collimating elements 115, 117, the red light is able to pass them. For example, collimating element 115 can be reflective of green light but transmissive for red. Thus, properties for blue light are not crucial here. As will be explained below, the collimating element 115 can optionally be a band stop type filter and thus also transmit blue, e.g. a glass plate with on each side a 14-layer $SiO_2$ and $Ta_2O_5$ filter, or optionally a low pass filter transmitting red light but reflecting green. It might reflect blue light, but this is not a necessary property.

In a similar way, light from light source 119, for example green light, is collimated by collimation elements 115 and 116 while just passing through neighboring collimation elements 110, 117, and light from light source 120, for example blue light, is collimated by collimation elements 117 and 118 while just passing through neighboring collimation elements 110, 116. Here we can see that collimating element 116 need to reflect green light and transmit blue light, while properties for red light are arbitrary. Similarly, we can see that collimating element 117 needs to reflect blue light but transmit red and green light, and collimating element 118 needs to reflect blue light, while properties for green and red light is arbitrary, and thus, collimating element 118 can be a wide band reflector such as a metal or a coated metal. Thus, aggregated light with desired properties is emitted at the output end 114 of the collimation means 104. Collimation elements can thus be reflective for blue light and transmissive for red and green light, e.g. by a glass plate with on each side a 12-layer $SiO_2$ and $Ta_2O_5$ filter.

As suggested as an option above, the middle sub-collimator 107 do not have to comprise band stop type filters. This can be achieved taking into account what wavelengths that are present in the neighboring sub-collimators, and thus have to pass through the collimation elements. Thus, collimation element 115 can be a low pass filter only passing red light while reflecting green and blue light, and collimation element 116 can be a high pass filter only passing blue light while reflecting red and green light. An advantage of this is that it is easier to provide a proper low or high pass filter than a band stop type filter with good pass band features on either side of the stop band. Thus, using only low and high pass filters can improve performance of the lighting device 100, with less discoloration e.g. at bundaries of the light pattern.

Independent of the filter properties, at really flat incident of light towards the filters, at least a non-negligible amount of light is reflected. This unintentionally reflected light will deteriorate the provided light pattern and cause discoloration. The inventors have realized that especially the discoloration is due to asymmetry of the collimator. Therefore, according to an embodiment of the invention, compensation filters are provided to decrease this asymmetry, and thus discoloration.

Figure 2:
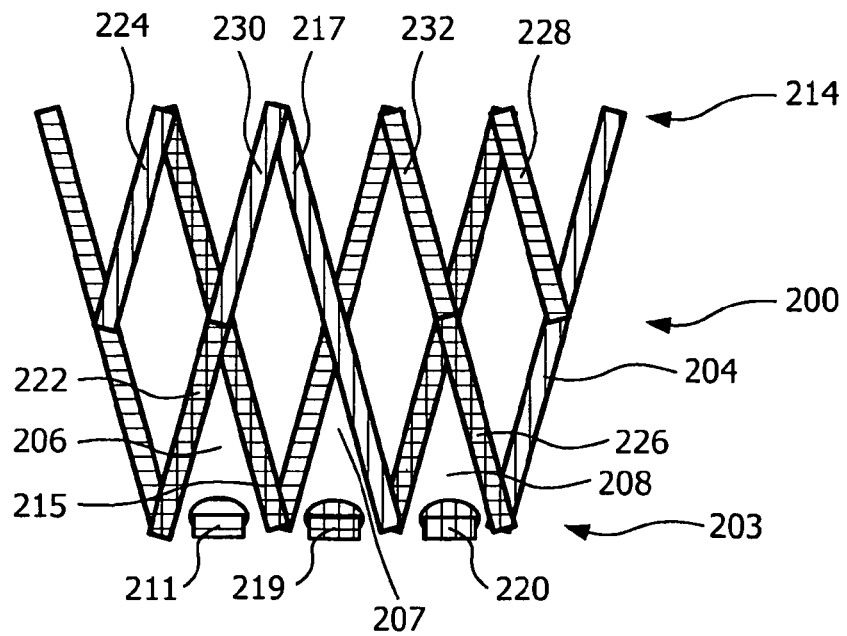
FIG. 2 schematically illustrates a lighting device according to an embodiment of the present invention.

FIG. 2 schematically illustrates a lighting device 200 according to an embodiment of the present invention having such compensation filters. In principle, the lighting device 200 of this embodiment comprises the features elucidated in the embodiment disclosed with reference to FIG. 1, and the elements in common will only be discussed when needed for reference to the special technical features of this embodiment. Reference will be parallelly made to FIG. 5, which illustrates exemplary reflection of rays in a lighting device like the one illustrated in FIG. 2. It should be noted that the principles illustrated in FIG. 5 is equally applicable to any of the embodiments having compensation filters.

Considering an exemplary light emitted from a light source 211 of the lighting device 200 which is supposed to be transmitted through a neighboring collimating element 215, but due to a flat incident towards this neighboring collimating element 215, at least a non-negligible part of the light is reflected by this neighboring collimating element 215, for example as illustrated by ray 500 in FIG. 5. Say light source 211 provides light with wavelength range of red light, the light pattern provided by the lighting device would provide too much red "to the left" unless compensated. Thus, for compensating for the part of the neighboring collimating element 215 closest to a receiving end 203 of collimating means 204 of the lighting device 200, a compensation filter 222 is arranged to provide symmetry in a sub-collimator 206 associated with the light source 211. Properties of compensation filter 222 is preferably matched with properties of collimating element 215, e.g. by having identical filter properties. Thus, a corresponding reflection "to the right" is provided, as illustrated by ray 502 in FIG. 5. FIG. 5 also illustrates other exemplary rays where unwanted reflection might occur, and corresponding compensation reflections in the compensation filters.

Similarly, for compensation of reflections in a next neighboring collimating element 217, and then for reflections in a part the next neighboring collimating element 217 closest to an output end 214 of the collimating means 204 sharing space with sub-collimator 206, a compensation filter 224 is provided symmetrically to this part of the next neighboring collimating element 217 closest to an output end 214.

In a similar way, compensation filters 226, 228 are provided in sub-collimator 208 associated with light source 220.

In continuation of the example where light source 211 provides red light, let us assume that light source 220 provides blue light. Then we will achieve a more spread light in colors red and blue, but this light is uniformly spread. On the other hand, we will probably be lacking the color of light source 219, for example green, in some parts of the light pattern to provide white light without discolorations. To compensate for this, compensation filters 230, 232 are provided to make the green light spread the same way as the red and blue light. These filters 230, 232 preferably transmit green light since they are present in the "green" sub-collimator 207. Properties for filter 230 in blue light range are arbitrary. However, compensation filter 230 is also present in the "red" sub-collimator 206 and thus needs to transmit red light, and in the example given here, compensation filter 230 is preferably a low pass filter transmitting red and green light, but reflecting blue light. In a corresponding way, compensation filter 232 is also present in the "blue" sub-collimator 208 and thus need to transmit blue light, and in the example given here, compensation filter 232 is preferably a filter transmitting blue and green light, e.g. an uncoated glass plate or a high pass filter transmitting blue and green but reflecting red light. Thus, total symmetry within sub-collimator 207 is not present for these compensation filters 230, 232, but in practice, this is not an issue, since the reflections is mostly dependent on the flat incident of light from light source 219, and not on the filter properties. However, compensation filter 232 needs to be transparent for green and red light, while properties for blue light are arbitrary.

The examples above is given where light sources 211, 219, 220 emits red, green, and blue light, respectively, for the easy understanding of the principles of the compensation filters. However, other assignments of emitted colors from the light sources are also possible, as can be readily understood by a person skilled in the art. Similarly, the examples above is given where three light sources with different colors and their associated sub-collimators are used. However, as also can be readily understood by the person skilled in the art, more light sources with further colors, i.e. wavelength ranges, with associated sub-collimators can be used. More than one light source, e.g. LED, can be associated with each sub-collimator. For example, a red and an amber light source can be provided in one sub-collimator. The invention is applicable to both low-power light sources and high-power light sources, depending on the lighting application. The principle of using compensation filters is also applicable to other filters than wavelength selective filters, e.g. polarizing filters. To provide a lighting device according to different demands, not all the disclosed compensation filters are required. One or more of the compensation filters disclosed can be added to achieve a desired lighting device. For example, an option is to only have the compensation filters 222 and 226 depicted in FIG. 2, only compensation filters 224 and 228 depicted in FIG. 2, or compensation filters 222, 224, 226 and 228 depicted in FIG. 2.

FIG. 3a illustrates a lighting device 300 in pseudo section comprising a collimating means and light sources according to an embodiment of the present invention. In FIG. 3a collimating means have a structure similar to the one illustrated in FIG. 2. However, a structure as the one illustrated in FIG. 1 is equally possible as an alternative embodiment. As will be discussed below, further embodiments comprising more or less compensation filters are equally possible. The lighting device 300 further comprises a surrounding reflector 302, which can be a metallic reflector. The reflector can serve to reflect any light that is not reflected by the outer collimating elements 304, 306, and/or to carry the collimating means. As an option, the outer collimating elements 304, 306 are not filters at all, where the reflections is made directly on the surrounding reflector 302, which principle is more particularly illustrated in FIG. 4a. As illustrated in FIG. 3b, which is the lighting device 300 in section along line A-A, the reflector 302 also serves for collimation perpendicular to the collimation elements of the collimating means. Optionally, a diffusor 308 can be provided at an output end of the collimating means. The diffusor 308 can be a holographic diffusor. The holographic diffusor is made with holographic techniques, but does not rely on interference, and thus has very little chromatic aberrations.

LEDs has been used as examples above, but other light sources are also possible to use, such as lasers, fluorescent lamps, etc.

FIG. 4a illustrates a lighting device 400 in pseudo section comprising a collimating means and light sources according to an embodiment of the present invention. The collimating means comprises collimating elements 402 and compensation filters 404 having similar function as has been discussed with reference to FIGS. 2 and 5. As has been discussed above, further embodiments comprising more or less compensation filters are equally possible. The special features illustrated in FIG. 4a is that collimation elements 402 at a part 406 of the collimating elements closest to a receiving end 407 of collimating means of the lighting device 400 are angled to a general light output direction with a first angle, while collimation elements 402 at a part 408 of the collimating elements closest to a output end 409 of collimating means of the lighting device 400 are angled to a general light output direction with a second angle. The angles are preferably optimized taking into account the filter angular dependencies. While the angles to a general light output direction for all collimating elements and optional compensation filters of the collimating means illustrated in FIG. 3a preferably are 3 to 30 degrees, preferably 5 to 15 degrees, preferably 8 to 9 degrees, the first and second angles of collimating means illustrated in FIG. 4a is 15 to 30 degrees, preferably 20 to 25 degrees, preferably 21 to 22 degrees, and 3 to 15 degrees, preferably 4 to 10 degrees, preferably 5 to 6 degrees, respectively. The corresponding angles of the compensation filters are of course the same as the collimating elements they are arranged to compensate for.

FIG. 4b illustrates the lighting device 400 in section along line B-B, where a surrounding reflector 412 also serves for collimation perpendicular to the collimation elements of the collimating means.

Optionally, a diffusor 410 can be provided at an output end of the collimating means. The diffusor 410 can be a holographic diffusor. The holographic diffusor is made with holographic techniques, but does not rely on interference, and thus has very little chromatic aberrations.

The examples given above with reference to FIG. 4 where three light sources with different colors and their associated sub-collimators are used. However, as also can be readily understood by the person skilled in the art, more light sources with further colors, i.e. wavelength ranges, with associated sub-collimators can be used. More that one light source, e.g. LED, can be associated with each sub-collimator. For example, a red and an amber light source can be provided in one sub-collimator. The invention is applicable to both low-power light sources and high-power light sources, depending on the lighting application. The principle of using compensation filters is also applicable to other filters than wavelength selective filters, e.g. polarizing filters. To provide a lighting device according to different demands, not all the disclosed compensation filters are required. One or more of the compensation filters disclosed can be added to achieve a desired lighting device similar to what has been discussed with reference to FIG. 2.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A lighting device comprising:
   a plurality of light sources providing light in different wavelengths,
   a collimator having a receiving end and an output end, said light sources being arranged at said receiving end, said collimator comprising:
   a first set of wavelength selective filters arranged as sub-collimators corresponding to each of said plurality of light sources such that, for each light source, said corresponding sub-collimator collimates the light therefrom, and said wavelength selective filter of said each light source is at least translucent for light from adjacent light sources of different wavelength; and
   a second set of wavelength selective filters comprising compensation filters wherein said compensation filters are arranged symmetrically with respect to corresponding part of the wavelength selective filter of said first set around a general light direction of the corresponding light source;
   said compensating filters forming discontinuous wavelength selective filters in said second set of wavelength selective filters from said receiving end of said collimator to said output end.

2. The lighting device according to claim 1, wherein at least one of said at least one compensation filter has similar filter properties as its corresponding part of wavelength selective filter of said first set.

3. The lighting device according to claim 1, wherein at least one of said at least one compensation filter is an all pass filter such that any reflection is due to flat incident light angle.

4. The lighting device according to claim 1, wherein said at least one compensation filter has properties of essentially passing wavelengths associated to the sub-collimator or sub-collimators in which they are present, respectively.

5. The lighting device according to claim 1, wherein said filters have an angle to a general light output direction of 3 to 30 degrees.

6. The lighting device according to claim 1, wherein those of said filters or parts of filters arranged at a part closest to said receiving end have an angle to a general light output direction of 15 to 30 degrees, and those of said filters or parts of filters arranged at a part closest to said output end have an angle to a general light output direction of 3 to 15 degrees.

7. The lighting device according to claim 1, wherein said wavelengths of light are essentially in the range of wavelength for visible light.

8. The lighting device according to claim 1, wherein said light sources comprises solid state light sources.

9. The lighting device according to claim 8, wherein said solid state light sources comprises light emitting diodes.

10. The lighting device according to claim 1, wherein said light sources comprises three light sources emitting essentially red, green, and blue light, respectively.

11. The lighting device according to claim 1, wherein any of the wavelength selective filters is a dichroic filter.

12. The lighting device according to claim 1, wherein said collimator further comprises a surrounding reflector.

13. The lighting device according to claim 1, further comprising a diffusor at said output end.

14. The lighting device according to claim 13, wherein said diffusor is a holographic diffusor.

15. The lighting device according to claim 1, wherein said wavelength selective filters are high pass or low pass filters.

16. The lighting device according to claim 15, wherein a wavelength selective filter of any of said sub-collimators for a light source adjacing another light source having longer wavelength is a low pass filter, and a wavelength selective filter of any of said sub-collimators for a light source adjacing another light source having shorter wavelength is a high pass filter.

17. The lighting device according to claim 15, wherein said light sources are arranged in wavelength order.

* * * * *